(12) United States Patent
Dufour

(10) Patent No.: US 6,351,572 B1
(45) Date of Patent: Feb. 26, 2002

(54) METHOD OF RECONSTRUCTION OF TRIDIMENSIONAL SCENES AND CORRESPONDING RECONSTRUCTION DEVICE AND DECODING SYSTEM

(75) Inventor: Cécile Dufour, Paris (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/124,629

(22) Filed: Jul. 29, 1998

(30) Foreign Application Priority Data

Jul. 29, 1997 (EP) .............................. 97401822

(51) Int. Cl.⁷ ................................................ G06K 9/36
(52) U.S. Cl. ......................... 382/285; 345/419; 382/154
(58) Field of Search ................................ 382/285, 291, 382/300, 154, 171, 282, 203; 345/419, 139; 356/12; 348/578, 580

(56) References Cited

U.S. PATENT DOCUMENTS

| | | | | |
|---|---|---|---|---|
| 5,283,837 A | * | 2/1994 | Wood ............................. | 382/6 |
| 5,479,603 A | * | 12/1995 | Stone et al. ................. | 395/161 |
| 5,530,774 A | * | 6/1996 | Fogel ........................... | 382/154 |
| 5,598,515 A | | 1/1997 | Shashua ....................... | 395/122 |
| 5,684,890 A | * | 11/1997 | Miyashita et al. ........... | 382/154 |
| 5,689,577 A | * | 11/1997 | Arata ........................... | 382/128 |
| 5,751,852 A | * | 5/1998 | Marimont et al. .......... | 382/180 |
| 5,818,959 A | * | 10/1998 | Webb et al. ................. | 382/154 |
| 5,917,937 A | * | 6/1999 | Szeliski et al. .............. | 382/154 |
| 6,009,188 A | * | 12/1999 | Cohen et al. ................ | 382/154 |

OTHER PUBLICATIONS

"Multiframe image point matching and 3–D surface reconstruction", by Roger Y. Tsai, IEEE Transactions on Pattern Analysis and Machine Intelligence, vol. PAMI–5, No. 2, Mar. 1983, pp. 159–174.

* cited by examiner

*Primary Examiner*—Bhavesh Mehta
*Assistant Examiner*—Yosef Kassa
(74) *Attorney, Agent, or Firm*—Russell Gross

(57) ABSTRACT

The invention relates to a new method of reconstruction of tridimensional scenes. While conventional methods are often limited to the 3D reconstruction of the bounding volume of the concerned objects, the proposed method of recovery of a 3D geometric model from 2D views taken by one single camera, giving an information even about the parts which are hidden in each view, is implemented according to a first depth labeling step, implemented in a sub-system (11) and including initialization and projection sub-steps followed by a refinement process, and to a second reconstruction step, implemented in a sub-system (12). By means of a close cooperation of the 3D depth maps thus obtained for two views of a scene, a 3D model is identified and extracted.

4 Claims, 5 Drawing Sheets

METHOD OF RECONSTRUCTION OF TRIDIMENSIONAL SCENES AND CORRESPONDING RECONSTRUCTION DEVICE AND DECODING SYSTEM

BACKGROUND OF THE INVENTION

The present invention relates to a method of reconstruction of a tridimensional scene from a bidimensional video sequence corresponding to N successive images of a real scene, and to a corresponding reconstruction device and a decoding system.

In light of recent advances in technology (and in the framework of all what is related to the future MPEG-4 standard intended to provide means for encoding graphic and video material as objects having given relations in space and time) all what relates to stereo images and virtual environments is becoming an important tool, for instance in engineering, design or manufacturing. Stereo images, usually generated by recording two slightly different view angles of the same scene, are perceived in three dimensions (3D) if said images are considered by pairs and if each image of a stereo pair is viewed by its respective eye. Moreover, in such stereo and virtual reality contexts, a free walkthrough into the created environments is required and possible. This creation of virtual environments is performed by means of picture synthesis tools, typically according to the following steps:

(a) a recovery step of a 3D geometric model of the concerned scene (for instance, by using a facet representation);

(b) a rendering step, provided for computing views according to specific points of view and taking into account all the known elements (for instance, lights, reflectance properties of the facets, correspondence between elements of the real views, . . . )

The reconstruction of a 3D geometric model of a scene however requires to perform an image matching among all available views. In the document "Multiframe image point matching and 3D surface reconstruction", R. Y. Tsai, IEEE Trans. on Pattern Analysis and Machine Intelligence, vol.PAMI-5, n°2, March 1983, pp.159–174, such a correspondence problem is solved by computing a correlation function that takes into account (inside a defined search window, along an axis corresponding to the sampling grid of the input pictures) the information of all the other views in one single pass, providing in this way a rather robust method against noise and periodical structures. The minimum of this function provides an estimate of the depth of the pixel in the center of the search window. Unfortunately, this depth estimate has a non-linear dependence (in 1/x in the most simple case) to the sampling grid.

Moreover, the depth map estimation for a surface obtained from one picture cannot be easily compared with the depth map estimation of the same surface obtained from another picture, because they do not share the same reference grid (they are only referenced to their respective picture sampling grid).

SUMMARY OF THE INVENTION

A first object of the invention is to propose a scene reconstruction method which no longer shows these drawbacks.

To this end the invention relates to a method of reconstruction such as defined in the preamble of the description and which is moreover characterized in that it comprises in series, for each image, segmented into triangular regions, of the sequence:

(A) a first depth labeling step, in which, each view being considered as the projection of a continuous 3D sheet, a multi-view matching is performed independently on each view in order to get a disparity map corresponding to the depth map of said 3D sheet;

(B) a second 3D model extraction step, in which an octree subdivision of the 3D space is performed and the voxels (volume elements) lying in the intersection of all 3D depth sheets are kept. An octree is a tree-structured representation used to describe a set of binary valued volumetric data enclosed by a bounding cube and constructed by recursively subdividing each cube into eight subcubes, starting at the root node which is a single large cube:octrees are an efficient representation for many volumetric objects since there is a large degree of coherence between adjacent voxels in a typical object.

With such an approach, a correlation function along an axis corresponding to sampled values of depth in the 3D world coordinates system (constituting a depth sampling grid provided at will by the user) is computed taking all views into account, and the minimum of this function is directly related to an accurate value of depth in said coordinates system (this is a great advantage when multiple depth estimations are obtained from different viewpoints). The depth sampling grid is provided by the user at will and is advantageously chosen regularly spaced, taking however into account some preliminary knowledge about the surface to be reconstructed (for instance if said surface is known to lie within a predefined bound box, which is the case for indoor scenes).

The document U.S. Pat. No. 5,598,515 describes a system and method for reconstructing a tridimensional scene or elements of such a scene from a plurality of bidimensional images of said scene, but according to a complex procedure that is replaced, in the case of the invention, by a much more simple one submitted to successive refinements until convergence is obtained.

According to the invention, said depth labeling step preferably comprises in series an initialisation sub-step, provided for defining during a first iteration a preliminary 3D depth sheet for the concerned image, and a refinement sub-step, provided for defining, for each vertex of each region, an error vector corresponding for each sampled depth to the summation of correlated costs between each of the (N–1) pairs of views (for a sequence of N images) on a window specifically defined for said vertex and storing the index that provides the minimum correlation cost, an additional operation being intended to replace after the first iteration the initialisation sub-step by a projection sub-step provided first for adjusting the position and field of view of the image acquisition device according to its parameters and the vertex map near to the image plane, and then for listing for each vertex the voxels that intersect the line passing through the vertex and the optical center of said acquisition device, in the viewing direction, and selecting the nearest voxel to the image plane. Concerning said 3D model extraction step, it preferably comprises in series a resolution definition sub-step, provided for defining the resolution of the voxel grid, and a voxel selection sub-step, provided for keeping for each view the voxels lying inside the non-empty spaces provided by each depth map and then only keeping voxels lying at the intersection of all non-empty spaces.

Another object of the invention is to propose a reconstruction device allowing to carry out this method.

To this end the invention relates to a device for reconstructing a tridimensional scene from a bidimensional video sequence corresponding to N successive images of a real scene, characterized in that:

(I) each of the N images of the sequence is segmented into triangular regions;

(II) said device comprises, for processing each image of said sequence;

(A) a depth labeling sub-system, comprising itself in series:

(1) an initialisation device, provided for defining during a first iteration an error vector corresponding for a set of sampled depths to the summation of correlation costs between each of the (N−1) pairs of views and the index providing the minimum correlation cost, the depth value of each vertex of the regions being computed by interpolation between the depths obtained for the neighboring regions;

(2) a refinement device, provided for defining similarly for each vertex an error vector on a previously delimited window and, correspondingly, the index providing the minimum correlation cost;

(B) a reconstruction sub-system provided for selecting the resolution of the voxel grid and keeping, for each view, the voxels lying inside the non-empty spaces provided by each depth map and, finally, only the voxels lying at the intersection of all non-empty spaces;

(III) said depth labeling sub-system also comprises a projection device intended to replace during the following iterations the initialisation device and provided for adjusting the position and field of view of the image acquisition device, and the vertex map very near to the image plane, and, for each vertex, listing the voxels that intersect the line passing through the vertex and the optical center of said acquisition device in the viewing direction and selecting the nearest voxel to the image plane. The invention also relates to a video decoding system including such a reconstruction device.

BRIEF DESCRIPTION OF THE DRAWINGS

The advantages of the invention will now be better understood by referring to the following description and the accompanying drawings, in which.

DETAILED DESCRIPTION OF THE PREFERRED EMBODIMENTS

Figure 1:
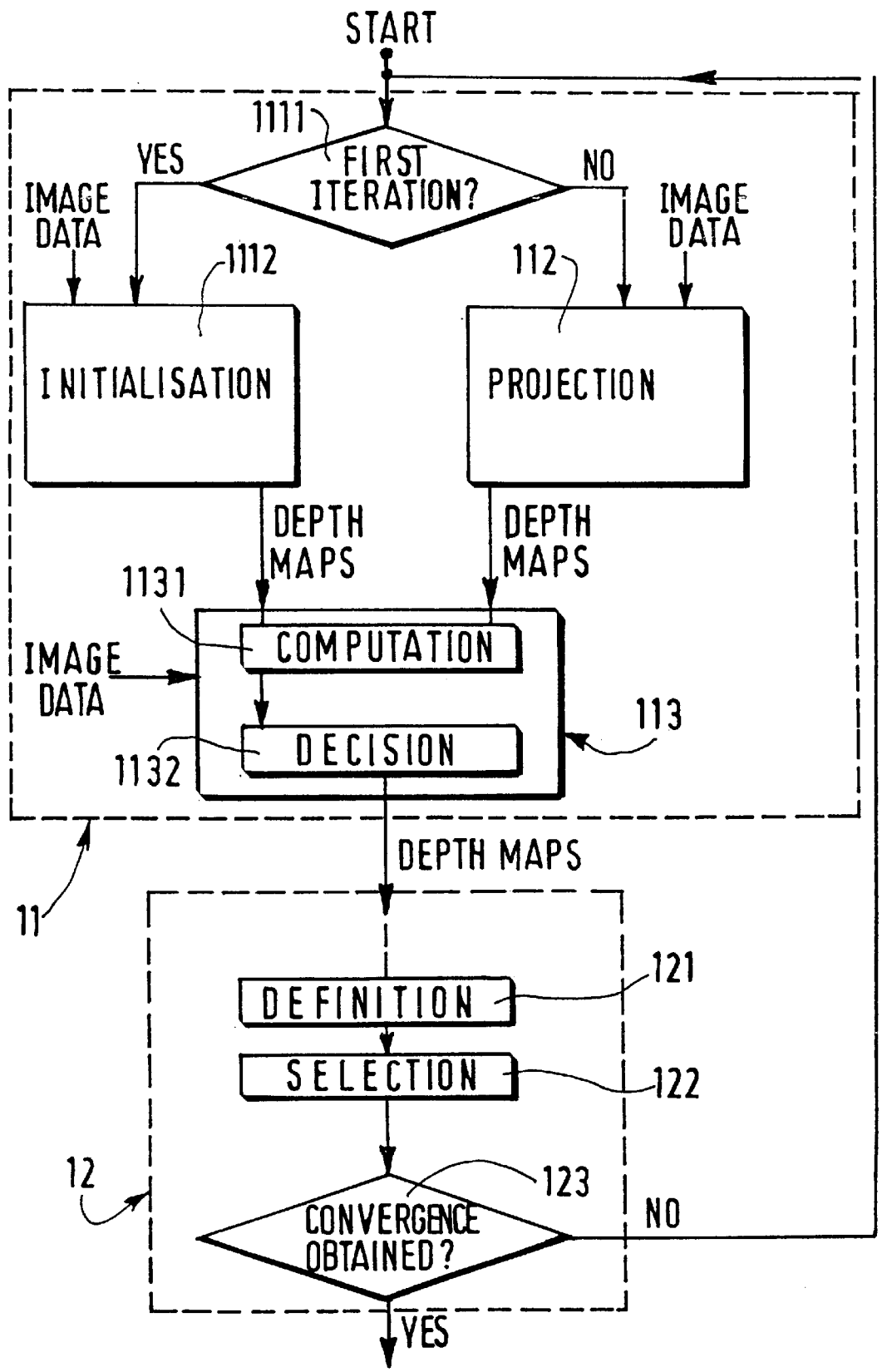
FIG. 1 shows the global scheme of a reconstruction device according to the invention.

The device shown in FIG. 1 is intended to allow, according to the invention, the reconstruction of scenes in three-dimensional form (3D), based on a sequence of N successive bidimensional images (2D) of said scenes. Said recovery is realized in two sub-systems 11 and 12, according to an implementation in two steps which are aimed to be iterated. The first step is a depth labeling one: each view is considered as the projection of a continuous 3D sheet, and a multi-view matching is performed independently on each view to get its disparity map, each disparity map then corresponding to the depth map of the 3D sheet (the disparity, the measurement of which provides a depth estimate, is the shift of a patch on the left (right) image relative to the right (left) image, and the output of any correspondence problem is a disparity map). The second step is a 3D model extraction one: an octree subdivision of the 3D space is performed and voxels lying in the intersection of all 3D depth sheets are kept.

The device of FIG. 1 is therefore subdivided into two parts: the depth labeling sub-system 11, for carrying out the first depth labeling step, and the 3D reconstruction sub-system 12, for carrying out the second 3D model extraction step. The depth labeling sub-system 11 itself comprises an initialisation device, a projection device 112, and a refinement device 113.

The initialisation device comprises, as illustrated in FIG. 1, a test circuit 1111 followed by an initialisation circuit 1112. The test circuit 1111 is provided for switching either towards the circuit 1112 (YES) when the iteration is the first one, at the start of the procedure, or towards the device 112 (NO) when the initialisation has already been done.

Figure 2:
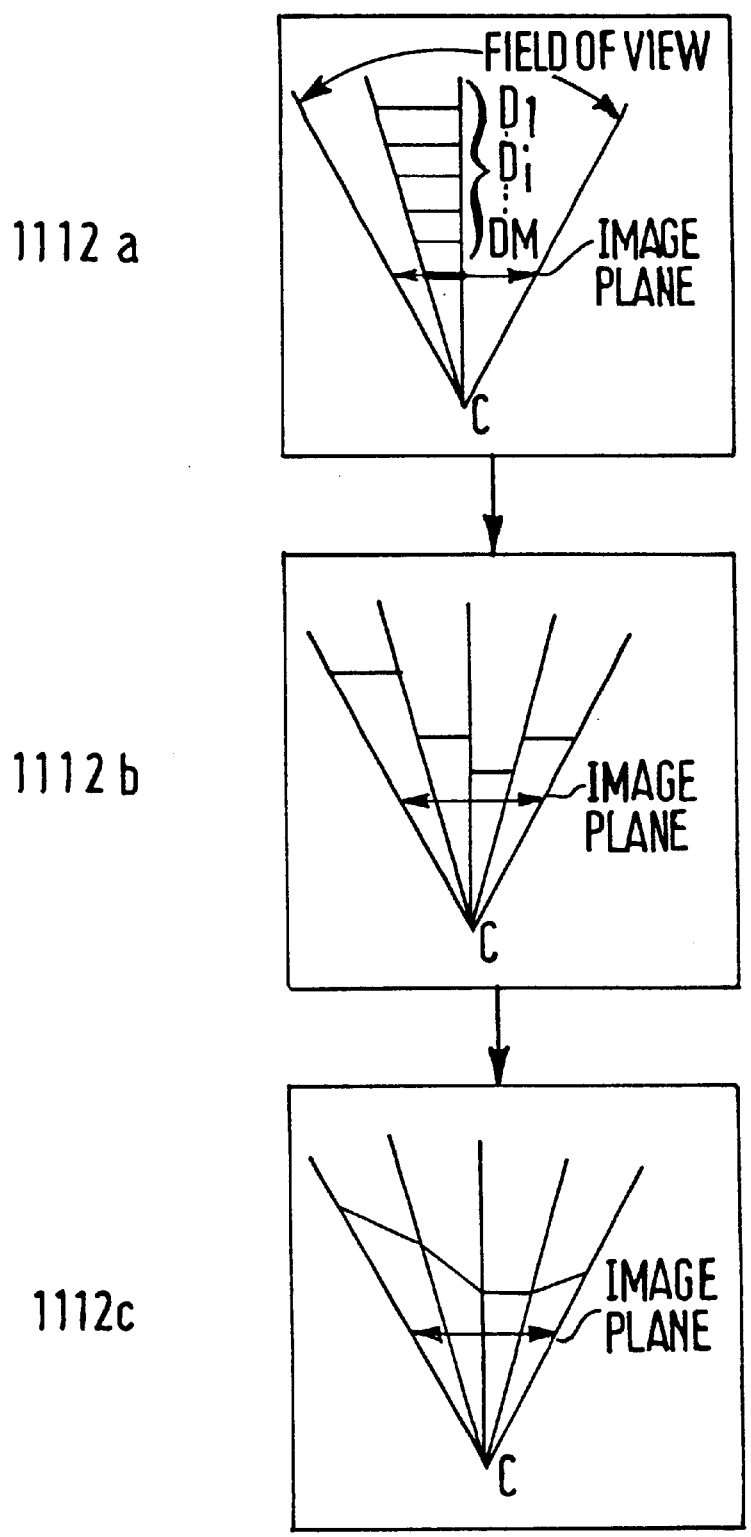
FIG. 2 illustrates the operations carried out in the initialisation device of the device of FIG. 1.

If I is the image for which one wishes to recover a depth sheet and I1 to IN the pictures used for multi-view matching, it is supposed that, within the concerned field of view, I is segmented into triangular regions supposed to lie parallel to the image plane of I. For each region R(I), three operations are then successively carried out in sub-steps 1112a, 1112b and 1112c (illustrated in FIG. 2), in order to obtain in the current field of view the depth of this region among a set S of predetermined depths D1, D2, . . . , Di, . . . , DM.

The sub-step 1112a (FIG. 2, upper part) allows to compute for each region an error vector V(i) of defined length, said vector corresponding, for each sampled depth (C is the reference optical center), to the summation of correlation costs between each of the (N−1) pairs of views (image i, image j), which may be expressed by:

$$V(i) = \sum_{i=1}^{i=N} \text{err}(i)[Ii, Ij]$$

Each coordinate i of V(i) corresponds to the sum of the errors encountered at depth Di in each view. The correlation measure err(i)[Ii, Ij] is a mean squared error between pixels of R(I) and pixels of the region R(Ij) in the image Ij assumed to lie at depth Di and obtained using the projection matrix relating the coordinates systems of the views I and Ij. The sub-step 1112b (FIG. 2, middle part) allows to find for each region the index providing the minimum correlation cost, and the sub-step 1112c (FIG. 2, lower part) to compute for each vertex of each region its depth value, by interpolation between the depths obtained for the neighboring regions (i.e. the depth of each vertex of the triangular regions will be the average of the depths of the regions sharing the vertex).

Thank to the initialisation, a preliminary 3D depth sheet is obtained for the image I. Each region R(I) has now an estimate of its 3D position and orientation, given by the 3D coordinates of its three vertices. However said orientation of the regions no longer complies with the initial assumption that they lie parallel to the image plane of the image I.

The initialisation device might then be used iteratively and run again while taking into account the new estimates of the orientations of each region in the image I. Another approach has finally been preferred: instead of searching for error vectors independently on each region, error vectors are searched independently for the vertices in I (depth estimates are now searched for each vertex while leaving the depth estimates on neighboring vertices unchanged). This approach is carried out in the refinement device 113.

Figure 3:
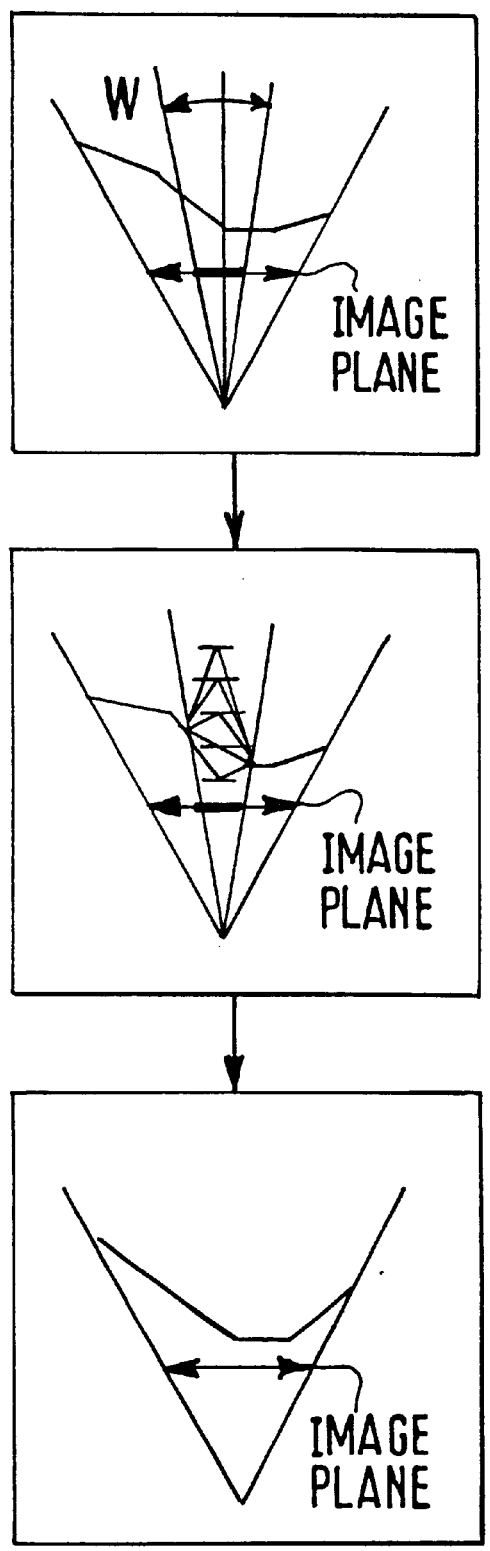
FIG. 3 illustrates the operations carried out in the refinement device of the device of FIG. 1.

This device 113, which receives, as illustrated in FIG. 1 (and in FIG. 3 showing the sub-steps carried out in said device), the depth maps available at the output of the circuit 1112, first comprises a vector computation circuit 1131, in which, for each vertex, a window W on which correlation costs will be measured is defined (FIG. 3, upper part). For each vertex, an error vector is then computed (FIG. 3, middle part), that corresponds, for each sampled depth, to the summation of correlation costs between each of the (N−1) pairs of views (image i, image j) on the delimited window. In a decision circuit 1132, the index providing the minimum correlation cost for each vertex is then found (FIG. 3, lower part). A refined 3D depth sheet is now available.

Figure 4:
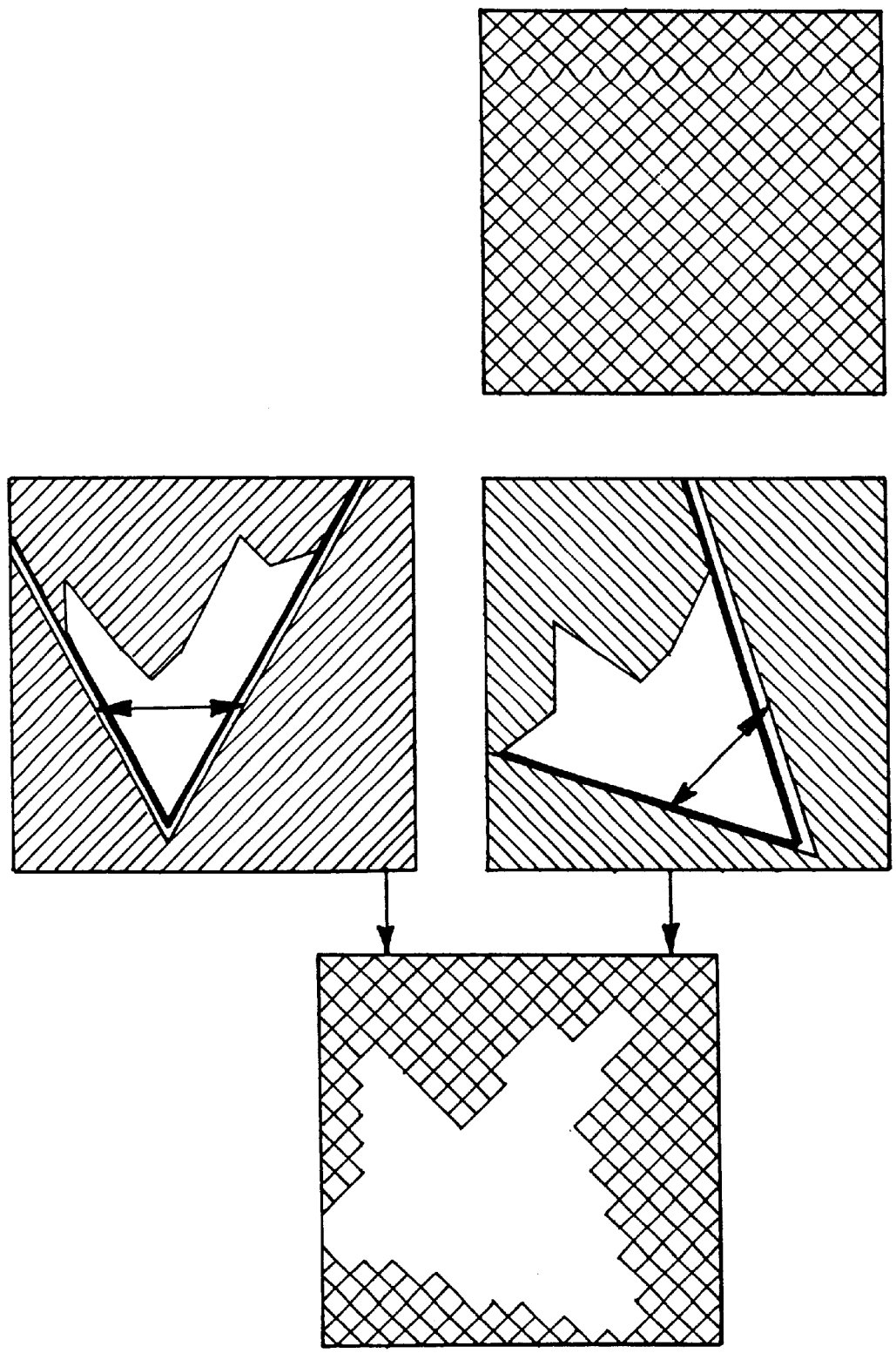
FIG. 4 illustrates the operations carried out in the 3D reconstruction sub-system of the device of FIG. 1.

The depth maps available at the output of the device 113 are the output signals of the depth labeling sub-system 11 and are sent towards the 3D reconstruction sub-system 12, that comprises, as illustrated in FIG. 1 (and in FIG. 4 showing the sub-steps carried out in said device), a resolution definition device 121 followed in series by a voxel selection device 122 and a test circuit 123. In the device 121, the resolution of the voxel grid is chosen (FIG. 4, upper part). In the device 122, for each view, the voxels lying inside the non-empty spaces provided by each depth map are kept (FIG. 4, middle part), and only the voxels lying at the intersection of all non-empty spaces are finally kept (FIG. 4, lower part). A test of convergence is then done in the test circuit 123, some of the previous steps having to be iterated until said convergence is obtained.

Figure 5:
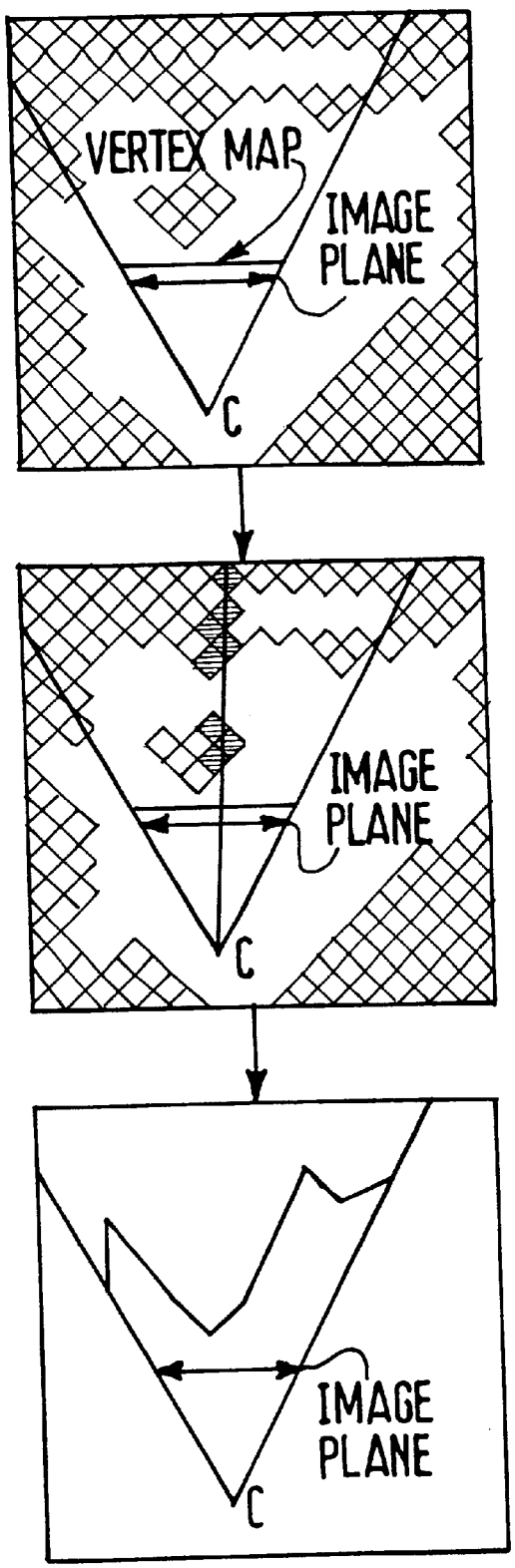
FIG. 5 illustrates the operations carried out in the projection device of the device of FIG. 1.

As the initialisation has been done during the previously described first iteration, at the beginning of the second one the test circuit 1111 now switches towards the projection device 112. With respect to the first sub-steps 1112a, 1112b, 1112c carried out in the circuit 1112, the sub-steps 1121a, 1121b now provided in the device 112 and illustrated in FIG. 5 allow: (a) to adjust (FIG. 5, upper part) the position and the field of view of the camera according to the camera parameters, and the vertex map very near to the image plane, and: (b) to list (FIG. 5, middle part) for each vertex the voxels that intersect the line passing through the vertex and the optical center of the camera, in the viewing direction, and to select the nearest voxel to the image plane. The output of said device 112, illustrated in FIG. 5, lower part, is then sent (as the output of the device 112 in the case of the first iteration) towards the refinement device 113, that functions as already described.

What is claimed is:

1. A method of reconstruction of a tridimensional scene from a bidimensional video sequence corresponding to N successive images of a real scene, comprising in series, for each image, segmented into triangular regions, of the sequence:

(A) a first depth labeling step, in which, each view being considered as the projection of a continuous 3D sheet, a multi-view matching is performed independently on each view in order to get a disparity map corresponding to the depth map of said 3D sheet;

(B) a second 3D model extraction step, in which an octree subdivision of the 3D space is performed and the voxels lying in the intersection of all 3D depth sheets are kept;

wherein said depth labeling step comprises in series an initialisation sub-step, provided for defining during a first iteration a preliminary 3D depth sheet for the concerned image, and a refinement sub-step, provided for defining, for each vertex of each region, an error vector corresponding for each sampled depth to the summation of correlated costs between each of the (N−1) pairs of views on a window specifically defined for said vertex and storing the index that provides the minimum correlation cost, an additional operation being intended to replace after the first iteration the initialisation sub-step by a projection sub-step provided first for adjusting the position and field of view of the image acquisition device according to its parameters and the vertex map near to the image plane, and then for listing for each vertex the voxels that intersect the line passing through the vertex and the optical center of said acquisition device, in the viewing direction, and selecting the nearest voxel to the image plane.

2. A method according to claim 1, wherein said 3D model extraction step comprises in series a resolution definition sub-step, provided for defining the resolution of the voxel grid, and a voxel selection sub-step, provided for keeping for each view the voxels lying inside the non-empty spaces provided by each depth map and then only keeping voxels lying at the intersection of all non-empty spaces.

3. A device for reconstructing a tridimensional scene from a bidimensional video sequence corresponding to N successive images of a real scene, characterized in that:

(I) each of the N images of the sequence is segmented into triangular regions;

(II) said device comprises, for processing each image of said sequence;

(A) a depth labeling sub-system, comprising itself in series:

(1) an initialisation device, provided for defining during a first iteration an error vector corresponding for a set of sampled depths to the summation of correlation costs between each of the (N−1) pairs of views and the index providing the minimum correlation cost, the depth value of each vertex of the regions being computed by interpolation between the depths obtained for the neighboring regions;

(2) a refinement device, provided for defining similarly for each vertex an error vector on a previously delimited window and, correspondingly, the index providing the minimum correlation cost;

(B) a reconstruction sub-system provided for selecting the resolution of the voxel grid and keeping, for each view, the voxels lying inside the non-empty spaces provided by each depth map and, finally, only the voxels lying at the intersection of all non-empty spaces;

(III) said depth labeling sub-system also comprises a projection device intended to replace during the following iterations the initialisation device and provided for adjusting the position and field of view of the image acquisition device, and the vertex map very near to the image plane, and, for each vertex, listing the voxels that intersect the line passing through the vertex and the optical center of said acquisition device in the viewing direction and selecting the nearest voxel to the image plane.

4. A video decoding system comprising a reconstruction device according to claim 3.

* * * * *